United States Patent
Borggaard

(10) Patent No.: US 8,768,762 B2
(45) Date of Patent: Jul. 1, 2014

(54) SYSTEM AND METHOD FOR TARGETING CUSTOMERS WHO INVITE OTHER CUSTOMERS TO A BUSINESS

(75) Inventor: Geoffrey Allen Borggaard, Lincoln, MA (US)

(73) Assignee: Google Inc., Mountain View, CA (US)

( * ) Notice: Subject to any disclaimer, the term of this patent is extended or adjusted under 35 U.S.C. 154(b) by 134 days.

(21) Appl. No.: 13/231,899

(22) Filed: Sep. 13, 2011

(65) Prior Publication Data

US 2013/0066696 A1    Mar. 14, 2013

(51) Int. Cl.
*G06Q 30/00* (2012.01)

(52) U.S. Cl.
USPC ....................................... 705/14.16

(58) Field of Classification Search
USPC .......................................... 705/14
See application file for complete search history.

(56) References Cited

U.S. PATENT DOCUMENTS

| | | | |
|---|---|---|---|
| 6,533,168 B1 | 3/2003 | Ching | |
| 2008/0306826 A1* | 12/2008 | Kramer et al. | 705/14 |
| 2009/0210480 A1 | 8/2009 | Sivasubramaniam et al. | |
| 2009/0234812 A1 | 9/2009 | Gupta et al. | |
| 2010/0141514 A1 | 6/2010 | Bell et al. | |
| 2012/0101883 A1 | 4/2012 | Akhter et al. | |

* cited by examiner

*Primary Examiner* — Saba Dagnew
(74) *Attorney, Agent, or Firm* — McDermott Will & Emery LLP

(57) ABSTRACT

A system and method is disclosed for rewarding subscribed users who invite other users to a business establishment. On receiving an indication that a subscribed user of a social group is at a business establishment, a message is sent to a plurality of users of the social group announcing that the user is at the business establishment. On receiving one or more signals, within a predetermined period, that one or more of the plurality of users entered into a purchase transaction with the business establishment, an offering is sent to the subscribed user.

23 Claims, 4 Drawing Sheets

SYSTEM AND METHOD FOR TARGETING CUSTOMERS WHO INVITE OTHER CUSTOMERS TO A BUSINESS

TECHNICAL FIELD

The subject technology relates generally to posting and displaying messages in a social network.

BACKGROUND

Smart phones and other GPS-enabled devices may be enabled to receive selective targeting by business establishments based on a transmitted location. For example, a smart device may notify a server associated with a business when its user comes within a predefined distance of the business, and, in response, the server may automatically transmit an advertisement or coupon for use at the business to the smart phone. In other aspects, a device may be integrated with a social network and configured to allow a user to "check-in" to a business and to share that information with other users in the user's social network group.

SUMMARY

The subject technology provides a system and computer-implemented method for targeting customers who invite other customers to a business. According to one aspect, the method includes receiving from a subscribed user, an indication that the subscribed user is at a business establishment, receiving a signal from one or more other users in a social group which includes the subscribed user, that the one or more other users arrived at the business establishment within a predetermined period of time after the indication was received from the subscribed user, and sending an offering to the subscribed user in response to receiving the signal. In another aspect, the method may include, on receiving the indication, sending to a plurality of users, a message that the subscribed user is at the business establishment, wherein the plurality of users include the one or more other users.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

A detailed description will be made with reference to the accompanying drawings.

DETAILED DESCRIPTION

Figure 1:
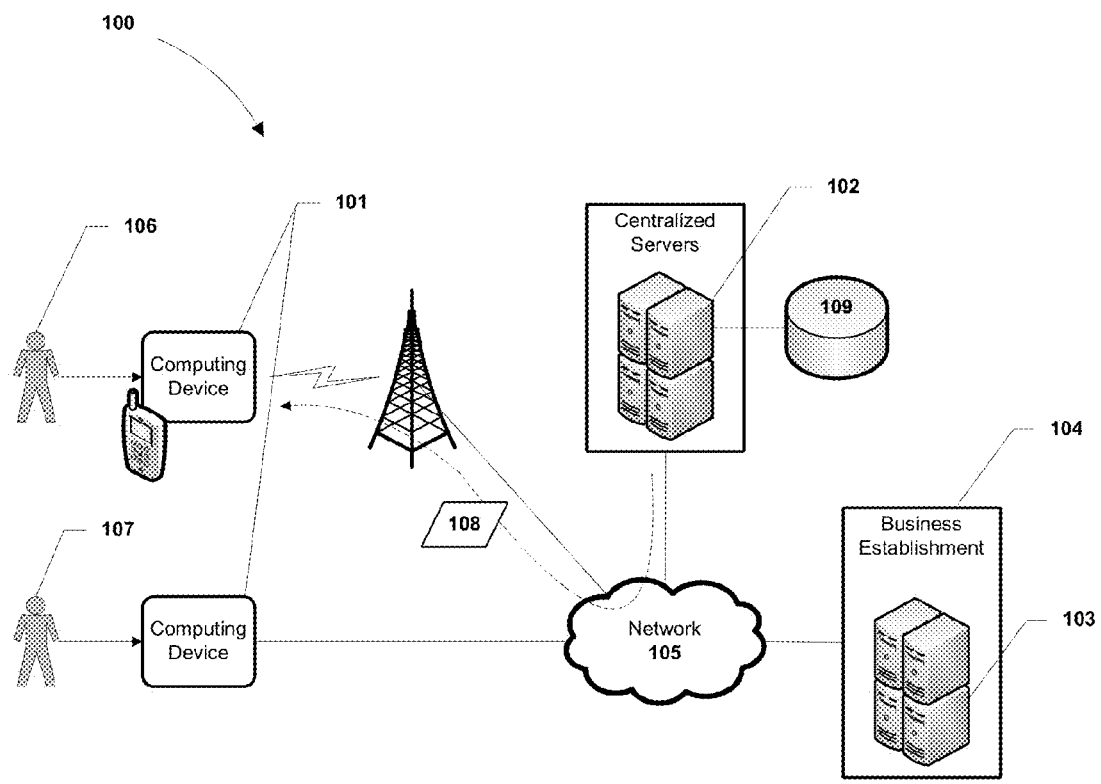
FIG. 1 is a diagram of a system for targeting customers who invite other customers to a business establishment according to one example of the subject technology.

FIG. 1 is a diagram of a system 100 for targeting customers who invite other customers to a business establishment according to one aspect of the subject technology. System 100 may include one or more smart computing devices 101 (for example, a smart phone, tablet or notebook computer, personal computer, PDA, or the like), one or more centralized servers 102, and one or more business servers 103 associated with a business establishment 104. Centralized servers 102 may be responsible for hosting a social network, including hosting message boards and forum discussions and the like, and for the sending and receiving of electronic messages to computing devices 101 over a network 105 (for example, a LAN, WAN, WiFi, cellular network, or the Internet). Centralized servers 102 or business servers 103 may be configured to provide one or more application programming interfaces (APIs) for the integration of mobile-to-web extension applications. For example, a social network hosted by centralized servers 102 may include a social check-in application that allows users of the social network to "check in" to a physical place using a smart phone, and share their location with their friends or contacts. In one aspect, users may check-in to the location by text messaging the location to centralized server 102. In another aspect, the application may use the phone's GPS to find the user's current location and then present a list of businesses at the current location to the user for selection. On one of the businesses being selected, the phone may send a message (for example, over network 105) to centralized servers 102 to update the social network with the user's current location.

In the depicted example, a computing device 101 (for example, a GPS-enabled smart phone) may be integrated with a check-in feature that enables a first subscribing user 106 to send an indication (for example, an announcement, message, or the like) to centralized servers 102 or business servers 103 that user 106 is at business establishment 104 (for example, at or near the first user's current geographic location). If the indication is received by business servers 103, business servers 103 may be configured to forward the indication to centralized servers 102. On receiving the indication, centralized servers 102 may send a message to other subscribing users 107 (for example, contacts of user 106 in a social network who are also using a device 101) that first user 106 is at business establishment 104. Subscribed users 107 may be designated or listed as contacts of user 106, or users of the social network who can view or receive messages from user 106. The message sent by servers 102 may be sent over network 105, through the social network, by way of an electronic text message or email, or the like.

In another aspect, the indication that user 106 is at business establishment 104 may be sent between computing devices 101, for example, bypassing centralized servers 102. In this regard, centralized servers 102 may be configured to detect the indication sent from user 106 to the other users 107, and/or detect that the other users received the message that first user 106 is at business establishment 104. Computing device 101 may, for example, be configured by a user with a separate application to inform other users that a user is at a business establishment, and to allow the detection of that notification by centralized servers 102. For example, computing device 101 may be configured by its user to allow, for example, monitoring of a check-in application, text messages, instant messages, email, or the like.

In one aspect, if, during the time that first user 106 remains at business 104, one or more of the other users 107 check-in to the same business location, centralized servers 102 may determine that first user 106 invited the one or more other users 107 to join him or her at that business, and send targeted advertising to first user 106, or offer first user 106 an offering. For example, centralized servers 102 may be configured to receive one or more signals (for example, messages, notifications, or the like) that one or more users 107 arrived at business establishment 104 within a predetermined period of time (for example, 20 or 30 minutes) after the indication from user 106 was received. On receiving the one or more signals within the period of time, centralized servers 102 may send an offering 108 to user 106. Offering 108 may be included in an electronic publication (for example, an email), and may include an advertisement related to business 104, one or more coupons redeemable at business 104 (for example, for a free coffee), a reward, or the like. In one aspect, centralized servers 102 may send a targeted advertisement to the one or more (for example, all) users 107 who arrived at business establishment 104 within the predetermined time. In other aspects, servers 102 may send an offering only after a predetermined number of users 107 arrive at business establishment 104 (for example, on receiving the last of a predetermined number of signals).

In another aspect, a centralized server 102 may include or be operably connected to a database 109. Centralized server 102 may store in database 109 information pertaining to each time an offering is sent to a user by centralized server 102, contact information (for example, an email address) for the subscribed users 106 or 107 who arrived at business establishment 104, metrics on sales generated through the efforts of identified users 106 or users 107, or the like. A report may be periodically generated (for example, monthly) by centralized server 102 and sent to business servers 103. Business establishment 104 may then use the contact information in the report to provide targeted advertising to those customers who frequently invite other customers to business establishment 104, or otherwise bring sales to business establishment 104 or a similar businesses establishment.

Centralized server 102 or business servers 103 may be responsible for automatically sending the subscribed users the previously described offerings or targeted advertisements. In a further aspect, business establishment 104, rather than centralized server 102, may be responsible for sending the offering to the users. To this end, centralized server 102 may merely make a determination that a group of users are patronizing the business establishment together, and then send that information to business server 103 (for example, by the previously described report). Business establishment 104 may then send those individuals an offering directly (for example, by email of by direct U.S. mail service).

Figure 2:
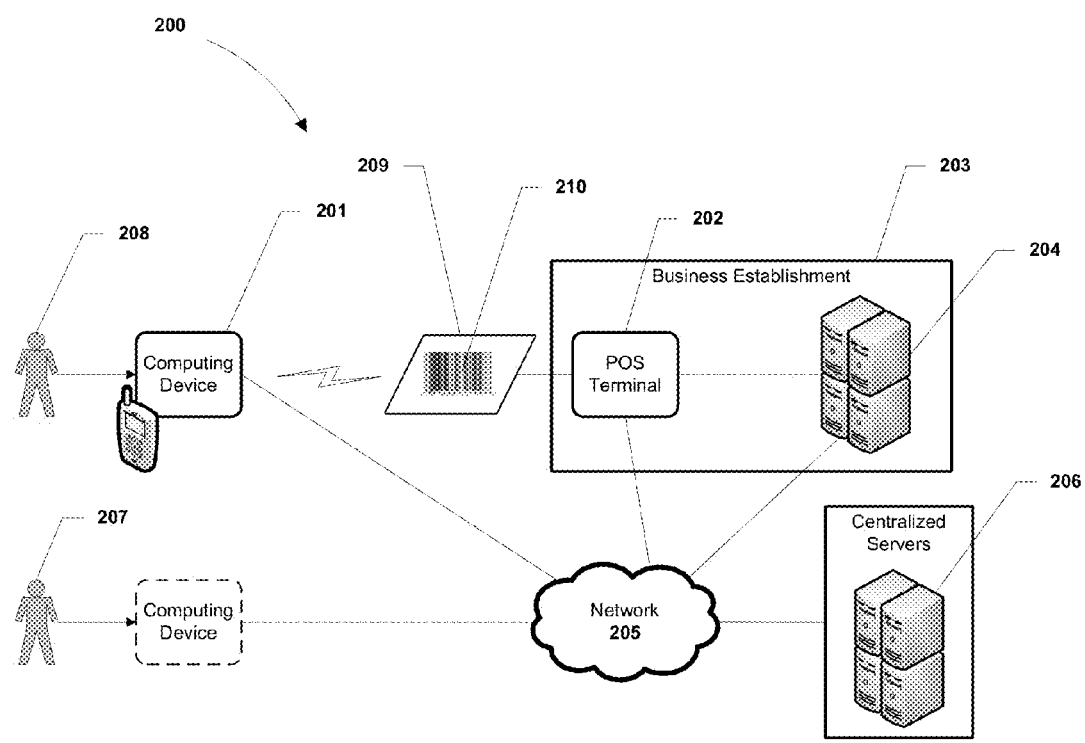
FIG. 2 is a diagram of a system for targeting customers who invite other customers to a business establishment according to one example of the subject technology.

FIG. 2 is a diagram of a system 200 for targeting customers who invite other customers to a business establishment according to one aspect of the subject technology. A system 200 may include one or more computing devices 201 (for example, device 101), and a point-of-sale (POS) terminal 202 at or associated with a business establishment 203. POS terminal 202 may be connected to a business server 204, for example, over a network 205. A centralized server 206 may be configured to send an offering to a first customer 207 (for example, user 106) if one or more second customers 208 (for example, users 107) makes a purchase at a business establishment 203. In one example, when a customer 208 makes a purchase, POS terminal 202 may provide customer 208 with a receipt 209, including a code 210 (for example, a barcode or sequence of numbers, letters, and/or symbols). Code 210 may specify a purchase code and/or the time and location of the purchase.

Customer 208 may enter or scan code 210 using his or her computing device 201, and device 201 may be configured to send the code 210, or information derived there from, to centralized server 206. For example, device 201 may send code 210 to centralized server 206 over network 205. In another aspect, customer 208 may text code 210 to a predetermined location (for example, phone number) printed on receipt 209. The scanning and/or sending of code 210 may cause device 201 to "check-in" to business establishment 203, or otherwise signal that customer 208 has arrived at business establishment 203. In another aspect, code 210 may inform centralized server 206 of the purchase, including, for example, the item purchased. After receiving code 210, centralized server 206 may send the previously described offering to first customer 207 or one or more second customers 208. In one aspect, purchase information obtained from code 210 may be used to limit the offering to certain products (for example, related to the purchase).

If multiple users in the same social group make a purchase at the same business establishment 203, within a certain period of time after an initial purchase (for example, by customer 207), centralized server 206 may make a determination that they came to the business together or to meet each other, and send one or more targeted advertisements to one or more of the users, or offer them the offering (for example, a coupon redeemable at the business or a similar business). In one aspect, centralized server 206 may determine that customer 207 (for example, who announced his or her location to the other users prior to the purchases being made) is the organizer of the group transactions, and send the advertisement or offering to that customer.

Figure 3:
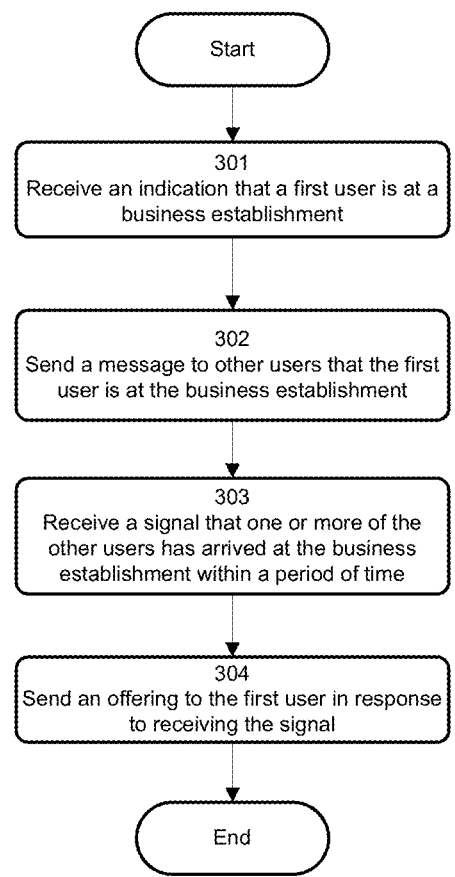
FIG. 3 is a flowchart illustrating a process for rewarding subscribed users who invite other users to a business establishment according to one example of the subject technology.

FIG. 3 is a flowchart illustrating a process for rewarding subscribed users who invite other users to a business establishment according to one aspect of the subject technology. According to one aspect, a social network (for example, system 100 or 200) may be integrated with a check-in service to recognize when a user subscribed to the social network is at a business establishment. In a first process 301, an indication is received at a server that the subscribed user is at a business establishment. On receiving the indication, in a second process 302, a message is sent to a plurality of users, informing them that the subscribed user is at the business establishment. In one aspect, the plurality of users may already be designated as "friends" of the subscribed user, or may be in the same social group with the subscribed user in a social network. In a third process 303, a signal is received from one or more other users in a social group with the subscribed user that the one or more other users arrived at the business establishment within a predetermined period of time after the indication was received from the subscribed user. Accordingly, the one or more users from which the signal was received may be may be considered to be included in the plurality of users and invited to the business establishment by the subscribed user. In a fourth process 304, an offering is sent to the subscribed user in response to receiving the signal.

Figure 4:
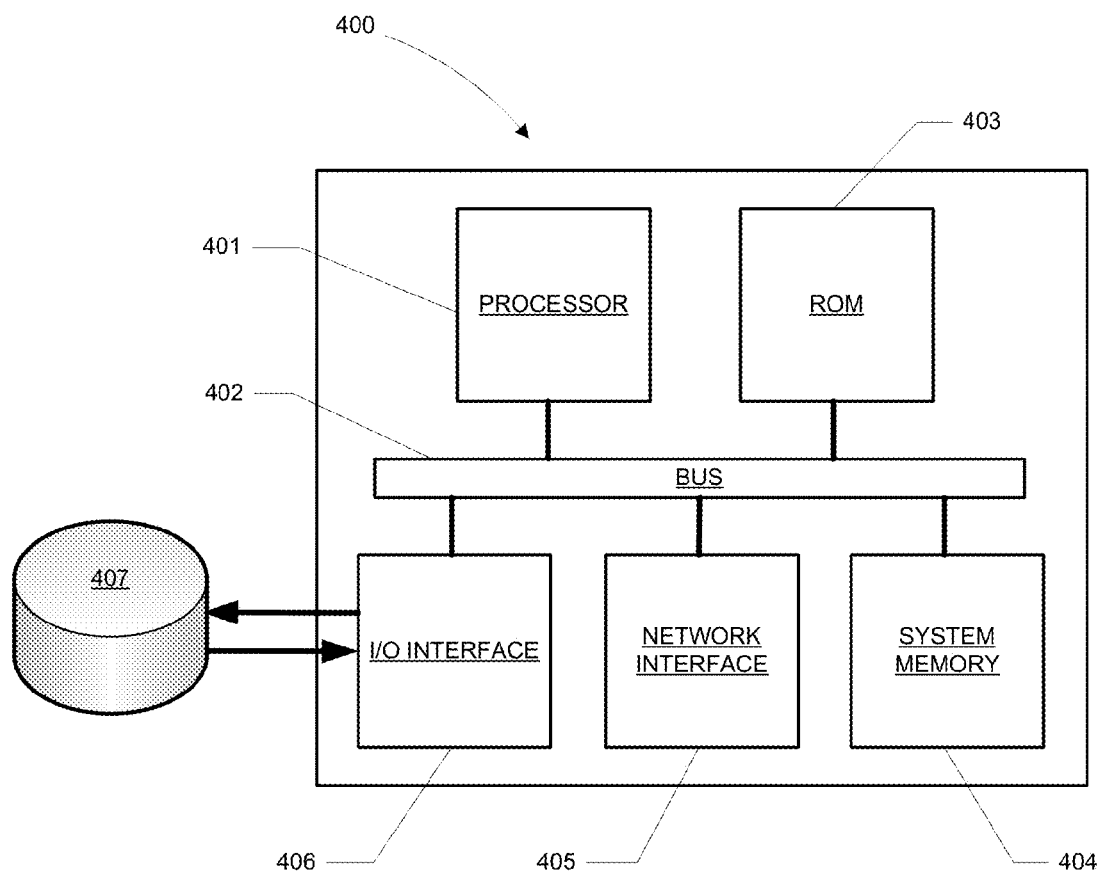
FIG. 4 is a diagram illustrating a machine or computer for targeting customers who invite other customers to a business establishment, including a processor and other internal components, according to one example of the subject technology.

FIG. 4 is a diagram illustrating a machine or computer for targeting customers who invite other customers to a business establishment, including a processor and other internal components, according to one aspect of the subject technology. In some aspects, a computerized device 400 (for example, computing device 101 or 201, server 102 or 103, or the like) includes several internal components such as a processor 401, a system bus 402, read-only memory 403, system memory 404, network interface 405, I/O interface 406, and the like. In one aspect, processor 401 may also be communication with a storage medium 407 (for example, a hard drive, database, or data cloud) via I/O interface 406. In some aspects, all of these elements of device 400 may be integrated into a single device. In other aspects, these elements may be configured as separate components.

Processor 401 may be configured to execute code or instructions to perform the operations and functionality described herein, manage request flow and address mappings, and to perform calculations and generate commands. Processor 401 is configured to monitor and control the operation of the components in server 400. The processor may be a general-purpose microprocessor, a microcontroller, a digital signal processor (DSP), an application specific integrated circuit (ASIC), a field programmable gate array (FPGA), a programmable logic device (PLD), a controller, a state machine, gated logic, discrete hardware components, or a combination of the foregoing. One or more sequences of instructions may be stored as firmware on a ROM within processor 401. Likewise, one or more sequences of instructions may be software stored and read from system memory 405, ROM 403, or received from a storage medium 407 (for example, via I/O interface 406). ROM 403, system memory 405, and storage medium 407 represent examples of machine or computer readable media on which instructions/code may be executable by processor 401. Machine or computer readable media may generally refer to any medium or media used to provide instructions to processor 401, including both volatile media, such as dynamic memory used for system memory 404 or for buffers within processor 401, and non-volatile media, such as electronic media, optical media, and magnetic media.

In some aspects, processor 401 is configured to communicate with one or more external devices (for example, via I/O interface 406). Processor 401 is further configured to read data stored in system memory 404 and/or storage medium 407 and to transfer the read data to the one or more external devices in response to a request from the one or more external devices. The read data may include one or more web pages and/or other software presentation to be rendered on the one or more external devices. The one or more external devices may include a computing system such as a personal computer, a server, a workstation, a laptop computer, PDA, smart phone, and the like.

In some aspects, system memory 404 represents volatile memory used to temporarily store data and information used to manage device 400. According to one aspect of the subject technology, system memory 404 is random access memory (RAM) such as double data rate (DDR) RAM. Other types of RAM also may be used to implement system memory 404. Memory 404 may be implemented using a single RAM module or multiple RAM modules. While system memory 404 is depicted as being part of device 400, those skilled in the art will recognize that system memory 404 may be separate from device 400 without departing from the scope of the subject technology. Alternatively, system memory 404 may be a non-volatile memory such as a magnetic disk, flash memory, peripheral SSD, and the like.

I/O interface 406 may be configured to be coupled to one or more external devices, to receive data from the one or more external devices and to send data to the one or more external devices. I/O interface 406 may include both electrical and physical connections for operably coupling I/O interface 406 to processor 401, for example, via the bus 402. I/O interface 406 is configured to communicate data, addresses, and control signals between the internal components attached to bus 402 (for example, processor 401) and one or more external devices (for example, a hard drive). I/O interface 406 may be configured to implement a standard interface, such as Serial-Attached SCSI (SAS), Fiber Channel interface, PCI Express (PCIe), SATA, USB, and the like. I/O interface 406 may be configured to implement only one interface. Alternatively, I/O interface 406 may be configured to implement multiple interfaces, which are individually selectable using a configuration parameter selected by a user or programmed at the time of assembly. I/O interface 406 may include one or more buffers for buffering transmissions between one or more external devices and bus 402 and/or the internal devices operably attached thereto.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

The term website, as used herein, may include any aspect of a website, including one or more web pages, one or more servers used to host or store web related content, and the like. Accordingly, the term website may be used interchangeably with the terms web page and server. The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A computer-implemented method for rewarding subscribed users who invite other users to a business establishment, the method comprising:
   receiving, at one or more computing devices, an indication that a subscribed first user is at a business establishment;
   receiving, at the one or more computing devices, a signal that one or more second users arrived at the business establishment within a predetermined period of time after the indication was received from the subscribed first user; and
   sending an offering to the subscribed first user in response to receiving the signal.

2. The computer-implemented method of claim 1, further comprising:
   on receiving the indication, sending to a plurality of users, a message that the subscribed first user is at the business establishment, wherein the plurality of users include the one or more second users.

3. The computer-implemented method of claim 1, wherein the offering includes a coupon redeemable at the business establishment.

4. The computer-implemented method of claim 1, wherein the offering includes an advertisement related to the business establishment.

5. The computer-implemented method of claim 1, wherein the offering is sent on receiving signals from a predetermined number of second users.

6. The computer-implemented method of claim 1, wherein the signal includes information related to a purchase transaction at the business establishment.

7. The computer-implemented method of claim 1, further comprising:
   generating a barcode related to a purchase transaction involving the subscribed first user at the business establishment, wherein receiving the indication from the subscribed first user includes receiving information generated from a scan of the barcode at the business establishment.

8. The computer-implemented method of claim 7, wherein receiving the one or more signals includes:
   receiving scanned information from a barcode associated with a purchase made at the business establishment during the period of time after the indication was received.

9. The computer-implemented method of claim 1, wherein the indication is received from the subscribed first user.

10. The computer-implemented method of claim 9, wherein receiving the indication from the subscribed first user includes receiving a message from a computing device associated with the subscribed first user.

11. The computer-implemented method of claim 1, further comprising:
    on receiving the signal from the one or more other users, sending an advertisement to the one or more second users.

12. The computer-implemented method of claim 1, further comprising:
    generating a report identifying contact information for users who have received offerings when other users in their social group arrived at the business establishment;
    sending the report to a server associated with the business establishment.

13. The computer-implemented method of claim 1, wherein the signal is received from the one or more second users, wherein the one or more second users are in a social group which includes the subscribed first user.

14. A computer-implemented method, comprising:
    receiving, at one or more computing devices, an indication that a first user of a social group is at a business establishment;
    sending a message to a plurality of second users of the social group that the first user is at the business establishment after receiving the indication;
    within a predetermined period after the indication was received, receiving, at the one or more computing devices, one or more signals that a respective one or more of the plurality of second users entered into a purchase transaction with the business establishment; and
    sending an electronic publication to the first user in response to receiving the one or more signals.

15. A computer-implemented method of claim 14, wherein the electronic publication includes a coupon redeemable at the business establishment.

16. A computer-implemented method of claim 14, wherein the electronic publication includes an advertisement related to the business establishment.

17. The computer-implemented method of claim 14, further comprising:

sending an advertisement related to the business establishment to the respective one or more of the plurality of second users.

18. The computer-implemented method of claim 14, wherein the electronic publication is sent on receiving signals from a predetermined number of the plurality of second users.

19. The computer-implemented method of claim 14, further comprising:
for each purchase transaction, generating a barcode to be displayed on a receipt, wherein a corresponding signal includes information scanned from the barcode.

20. The computer-implemented method of claim 14, further comprising:
generating a report identifying subscribed users who were at the business establishment within a predetermined period before other associated users entered into a purchase transaction with the business establishment; and
sending the report to the business establishment.

21. A computer-implemented method of claim 14, wherein the indication is received from a handheld computing device associated with the first user and each signal is received from a handheld computing device associated with one of the plurality of second users.

22. A system for rewarding subscribed users who invite other users to a business establishment, the system comprising:
a first computing device configured to send a first message to designated users of a social network when a user of the first computing device arrives at a business;
a second computing device configured to receive, within a predetermined period of time after the user of the first computing device arrived at the business, a second message that a user of the second computing device has arrived at the business; and
a server configured to receive the first message from the first computing device and, in response to receiving the first message, send the second message to the second computing device, the server further configured to receive a signal that a user of the second device has made a purchase at the business,
wherein, on receiving the signal that the user of the second device has made the purchase, the server is further configured to send an electronic offering to the first computing device for use by the first user at the business.

23. A computer-implemented method, comprising:
receiving, at one or more computing devices, an indication that a first user of a social group is at a business establishment;
detecting, at the one or more computing devices, a message sent to a plurality of second users of the social group that the first user is at the business establishment after receiving the indication;
within a predetermined period after the indication was received, receiving one or more signals that a respective one or more of the plurality of second users entered into a purchase transaction with the business establishment; and
sending an offering to the first user in response to receiving the one or more signals.

* * * * *